(12) United States Patent
Truax

(10) Patent No.: US 11,053,871 B1
(45) Date of Patent: Jul. 6, 2021

(54) ADAPTIVE ENGINE CONTROL MODULE

(71) Applicant: Advanced Fuel Dynamics, Inc., Troy, TX (US)

(72) Inventor: Ryan Truax, Troy, TX (US)

(73) Assignee: Advanced Fuel Dynamics, Inc., Troy, TX (US)

(*) Notice: Subject to any disclaimer, the term of this patent is extended or adjusted under 35 U.S.C. 154(b) by 0 days.

(21) Appl. No.: 17/122,194

(22) Filed: Dec. 15, 2020

(51) Int. Cl.
*F02D 41/18* (2006.01)
*F02D 41/00* (2006.01)

(52) U.S. Cl.
CPC ......... *F02D 41/0025* (2013.01); *F02D 41/18* (2013.01); *F02D 2200/0406* (2013.01); *F02D 2200/0414* (2013.01); *F02D 2200/06* (2013.01); *F02D 2200/0602* (2013.01)

(58) Field of Classification Search
CPC ............... F02D 41/0025; F02D 41/18; F02D 2200/0602; F02D 2200/0406; F02D 2200/0414
USPC ........ 123/488, 1 A; 701/102–105; 73/114.52
See application file for complete search history.

(56) References Cited

U.S. PATENT DOCUMENTS

| | | | |
|---|---|---|---|
| 5,261,270 A * | 11/1993 | Gonze | G01N 33/2852 123/1 A |
| 7,305,939 B2 | 12/2007 | Carlson | |
| 7,607,422 B2 | 10/2009 | Carlson et al. | |
| 9,658,204 B2 * | 5/2017 | VanVelzen | G01N 27/226 |
| 10,519,906 B2 | 12/2019 | Truax | |
| 2004/0000275 A1 * | 1/2004 | McIntyre | F02D 19/0634 123/1 A |
| 2008/0255753 A1 | 10/2008 | Spivak | |
| 2009/0000596 A1 | 1/2009 | Spivak | |

FOREIGN PATENT DOCUMENTS

DE 202008005475 U1 10/2008

* cited by examiner

*Primary Examiner* — Hai H Huynh
(74) *Attorney, Agent, or Firm* — Luedeka Neely Group, P.C.

(57) ABSTRACT

An apparatus intercepts and modifies sensor signals generated by vehicle sensors and provides the modified signals to an engine control unit in the vehicle. The engine control unit is configured to receive the modified sensor signals and generate engine control signals based thereon. The apparatus includes a fuel composition sensor and a fuel control module. The fuel composition sensor senses characteristics of fuel in the vehicle and generates a fuel composition signal based on the sensed characteristics. The fuel control module, which intercepts the sensor signals from the vehicle sensors, includes a processor programmed to generate modified sensor signals based on the intercepted sensor signals and the fuel composition signal. Based on the modified sensor signals, the engine control unit optimizes the performance of the engine for a given ratio of alcohol to gasoline in an alcohol/gasoline fuel blend.

18 Claims, 9 Drawing Sheets

ADAPTIVE ENGINE CONTROL MODULE

FIELD

This invention relates to the field of automobile engines. More particularly, this invention relates to an adaptive fuel control module for spark ignition direct-injection fuel injected engines that allows an engine to use different types of fuels.

BACKGROUND

Many automobile engines can only run on one type of fuel. Some known devices have tried to solve this problem by being reactive in design—responding based on what the engine has already done. This is how original equipment manufacturers address the problem with flex-fuel systems. Because such reactive systems rely on information received after combustion has already occurred, they are slow to respond, resulting in unsatisfactory performance.

Some conventional systems, such as depicted in FIG. 1, make constant changes to the fuel system to allow the engine to run on ethanol. Such systems rely on the factory-installed engine control unit (ECU) in the vehicle to make corrections based on the oxygen signal so that the engine can still run correctly on conventional gasoline. Because other systems in the vehicle can affect the functionality of the ECU, system performance is limited and the ECU processor cannot handle the changes needed to adjust for the different fuel mixtures. These systems do not measure and make corrections based on fuel content.

Other known systems, such as depicted in FIG. 2, use a fuel control module that modifies the signals the ECU provides to the fuel injectors to optimize the performance of the fuel injectors based on the type of fuel being used. Such a system is described in U.S. Pat. No. 10,519,906. These systems are unsatisfactory when used in spark ignition direct injected engines because such systems can only modify the injection pulse to make it longer to increase fuel delivery. Direct injection engines rely heavily on the injector timing staying within a predetermined window. The known systems would cause the injector's operation to fall outside the predetermined window, and may cause engine or component damage in doing so. Further, multi-point injection systems operate at a lower voltage and the ECU electronically controls the injector only on one side (typically the ground side). In contrast, direct injection systems are controlled on both sides of the injector for more accurate control of the fuel delivery and they are able to vary the control voltage during operation.

What is needed is a system that, rather than modifying signals after they have been generated by the ECU, instead modifies the signals from the various vehicle sensors before those signals are provided to the ECU, thereby allowing adjustment of the injectors' fuel pressure and timing to optimize the fuel delivery provided by the fuel injectors.

SUMMARY

The above and other needs are met by an adaptive fuel control module that intercepts signals from various vehicle sensors and, based on input from a fuel composition sensor, modifies the sensor signal values that are sent to the ECU. This causes the ECU to change its commands to various components to control fuel delivery and ignition timing based on the fuel composition, and to control boost pressure in systems that have integrated boost control.

Some preferred embodiments provide an apparatus for modifying sensor signals generated by vehicle sensors that are provided to an engine control unit in a vehicle. The engine control unit is configured to receive the sensor signals and generate engine control signals based at least in part on the sensor signals. The apparatus includes a fuel composition sensor and a fuel control module. The fuel composition sensor senses characteristics of fuel in the vehicle and generates a fuel composition signal based on the sensed characteristics. The fuel control module intercepts the sensor signals from the vehicle sensors, and a processor in the fuel control module generates modified sensor signals based at least in part on the intercepted sensor signals and the fuel composition signal. The modified sensor signals are provided to the engine control unit in place of the intercepted vehicle sensor signals.

In some embodiments, the fuel composition sensor generates the fuel composition signal that indicates a ratio of alcohol to gasoline in an alcohol/gasoline fuel blend.

In some embodiments, the vehicle sensors include a fuel pressure sensor that generates a fuel pressure signal indicative of a measured fuel pressure. The fuel control module intercepts the fuel pressure signal, and the processor of the fuel control module generates a modified fuel pressure signal indicating a fuel pressure value that is higher or lower than the measured fuel pressure.

In some embodiments, the vehicle sensors include a manifold air pressure sensor that generates a manifold air pressure signal indicative of a measured manifold air pressure. The fuel control module intercepts the manifold air pressure signal, and the processor of the fuel control module generates a modified manifold air pressure signal indicating a manifold air pressure that is higher or lower than the measured manifold air pressure.

In some embodiments, the vehicle sensors include a mass air flow sensor that generates a mass air flow signal indicative of a measured rate of mass air flow. The fuel control module intercepts the mass air flow signal, and the processor of the fuel control module generates a modified mass air flow signal indicating a rate of mass air flow that is higher or lower than the measured rate of mass air flow.

In some embodiments, the vehicle sensors include an oxygen sensor that generates an oxygen signal indicative of a measured oxygen level. The fuel control module intercepts the oxygen signal, and the processor of the fuel control module generates a modified oxygen signal indicating an oxygen level that is higher or lower than the measured oxygen level.

In some embodiments, the vehicle sensors include an intake air temperature sensor that generates an intake air temperature signal indicative of a measured intake air temperature. The fuel control module intercepts the intake air temperature signal, and the processor of the fuel control module generates a modified intake air temperature signal indicating an intake air temperature that is higher or lower than the measured intake air temperature.

In some embodiments, the vehicle sensors include a cam position sensor that generates a cam position signal indicative of a measured cam position. The fuel control module intercepts the cam position signal, and the processor of the fuel control module generates a modified cam position signal indicating a cam position that is different from the measured cam position.

In some embodiments, the vehicle sensors include a crank position sensor that generates a crank position signal indicative of a measured crank position. The fuel control module intercepts the crank position signal, and the processor of the fuel control module generates a modified crank position signal indicating a crank position that is different from the measured crank position.

In some embodiments, the vehicle sensors include a boost pressure sensor that generates a boost pressure signal indicative of a measured boost pressure. The fuel control module intercepts the boost pressure signal, and the processor of the fuel control module generates a modified boost pressure signal indicating a boost pressure that is higher or lower than the measured boost pressure.

Some preferred embodiments provide a method for optimizing the performance of a vehicle engine that is running on an alcohol/gasoline fuel blend. The method includes:
  (a) generating one or more measured sensor signals, each indicative of an operational characteristic of the engine;
  (b) generating a fuel composition signal that is indicative of a ratio of alcohol to gasoline in the alcohol/gasoline fuel blend;
  (c) based at least in part on the fuel composition signal, generating one or more modified sensor signals corresponding to the one or more measured sensor signals;
  (d) providing the one or more modified sensor signals to an engine control unit in the vehicle in place of the one or more measured sensor signals;
  (e) the engine control unit generating engine control signals based at least in part on the one or more modified sensor signals, wherein the engine control signals optimize the performance of the engine for the ratio of alcohol to gasoline in the alcohol/gasoline fuel blend.

In some embodiments:
step (a) further comprises generating a measured fuel pressure signal indicative of a measured fuel pressure;
step (b) further comprises generating the fuel composition signal indicating that the alcohol or gasoline content of the alcohol/gasoline fuel blend has changed;
step (c) further comprises:
  generating a modified fuel pressure signal indicating a fuel pressure that is lower than the measured fuel pressure if the alcohol content has increased; or
  generating a modified fuel pressure signal indicating a fuel pressure that is higher than the measured fuel pressure if the gasoline content has increased;
step (d) further comprises providing the modified fuel pressure signal to the engine control unit in place of the measured fuel pressure signal; and
step (e) further comprises the engine control unit generating an engine control signal that controls a fuel injector or fuel pump in the vehicle to increase or decrease the fuel flow rate depending on whether the fuel pressure indicated by the modified fuel pressure signal generated in step (c) is lower or higher than the measured fuel pressure, thereby optimizing the performance of the engine for the increased alcohol or gasoline content in the alcohol/gasoline fuel blend.

In some embodiments:
step (a) further comprises generating a measured manifold air pressure signal indicative of a measured manifold air pressure;
step (b) further comprises generating the fuel composition signal indicating that the alcohol or gasoline content of the alcohol/gasoline fuel blend has changed;
step (c) further comprises:
  generating a modified manifold air pressure signal indicating a manifold air pressure that is lower than the measured manifold air pressure if the alcohol content has increased; or
  generating a modified manifold air pressure signal indicating a manifold air pressure that is higher than the measured manifold air pressure if the gasoline content has increased;
step (d) further comprises providing the modified manifold air pressure signal to the engine control unit in place of the measured manifold air pressure signal; and
step (e) further comprises the engine control unit generating an engine control signal that controls a boost control or throttle body in the vehicle to increase or decrease the boost depending on whether the manifold air pressure indicated by the modified manifold air pressure signal generated in step (c) is lower or higher than the measured manifold air pressure, thereby optimizing the performance of the engine for the increased alcohol or gasoline content in the alcohol/gasoline fuel blend.

In some embodiments:
step (a) further comprises generating a measured manifold air pressure signal indicative of a measured manifold air pressure;
step (b) further comprises generating the fuel composition signal indicating that the alcohol or gasoline content of the alcohol/gasoline fuel blend has changed;
step (c) further comprises:
  generating a modified manifold air pressure signal indicating a manifold air pressure that is higher than the measured manifold air pressure if the alcohol content has increased; or
  generating a modified manifold air pressure signal indicating a manifold air pressure that is lower than the measured manifold air pressure if the gasoline content has increased;
step (d) further comprises providing the modified manifold air pressure signal to the engine control unit in place of the measured manifold air pressure signal; and
step (e) further comprises the engine control unit generating an engine control signal that controls a fuel injector or fuel pump in the vehicle to increase or decrease a fuel flow rate depending on whether the manifold air pressure indicated by the modified manifold air pressure signal generated in step (c) is higher or lower than the measured manifold air pressure, thereby optimizing the performance of the engine for the increased alcohol or gasoline content in the alcohol/gasoline fuel blend.

In some embodiments:
step (a) further comprises generating a measured oxygen signal indicative of a measured oxygen content;
step (b) further comprises generating the fuel composition signal indicating that the alcohol or gasoline content of the alcohol/gasoline fuel blend has changed;
step (c) further comprises:
  generating a modified oxygen signal indicating a leaner fuel ratio if the alcohol content has increased; or
  generating a modified oxygen signal indicating a richer fuel ratio if the gasoline content has increased;
step (d) further comprises providing the modified oxygen signal to the engine control unit in place of the measured oxygen signal; and
step (e) further comprises the engine control unit generating an engine control signal that controls a fuel injector or fuel pump in the vehicle to increase or decrease a fuel flow rate depending on whether the oxygen content indicated by the modified oxygen signal generated in step (c) indicates a leaner or richer fuel ratio than indicated by the measured oxygen content signal, thereby optimizing the performance of the engine for the increased alcohol or gasoline content in the alcohol/gasoline fuel blend.

In some embodiments:

step (a) further comprises generating a measured mass air flow signal indicative of a measured mass air flow rate;

step (b) further comprises generating the fuel composition signal indicating that the alcohol or gasoline content of the alcohol/gasoline fuel blend has changed;

step (c) further comprises:
  generating a modified mass air flow signal indicating a higher mass air flow rate if the alcohol content has increased; or
  generating a modified mass air flow signal indicating a lower mass air flow rate if the gasoline content has increased;

step (d) further comprises providing the modified mass air flow signal to the engine control unit in place of the measured mass air flow signal; and step (e) further comprises the engine control unit generating an engine control signal that controls a fuel injector or fuel pump in the vehicle to increase or decrease a fuel flow rate depending on whether the mass air flow rate indicated by the modified mass air flow signal generated in step (c) indicates a higher or lower mass air flow rate than indicated by the measured mass air flow signal, thereby optimizing the performance of the engine for the increased alcohol or gasoline content in the alcohol/gasoline fuel blend.

In some embodiments:

step (a) further comprises generating a measured intake air temperature signal indicative of a measured intake air temperature;

step (b) further comprises generating the fuel composition signal indicating that the alcohol or gasoline content of the alcohol/gasoline fuel blend has changed;

step (c) further comprises:
  generating a modified intake air temperature signal indicating a lower intake air temperature if the alcohol content has increased; or
  generating a modified intake air temperature signal indicating a higher intake air temperature if the gasoline content has increased;

step (d) further comprises providing the modified intake air temperature signal to the engine control unit in place of the measured intake air temperature signal; and step (e) further comprises the engine control unit generating an engine control signal that controls an ignition control or coils in the vehicle to increase or decrease ignition timing depending on whether the intake air temperature indicated by the modified intake air temperature signal generated in step (c) indicates a lower or higher intake air temperature than indicated by the measured intake air temperature signal, thereby optimizing the performance of the engine for the increased alcohol or gasoline content in the alcohol/gasoline fuel blend.

In some embodiments:

step (a) further comprises generating measured cam and crank position signals indicative of measured cam and crank positions;

step (b) further comprises generating the fuel composition signal indicating that the alcohol or gasoline content of the alcohol/gasoline fuel blend has changed;

step (c) further comprises:
  generating modified cam and crank position signals indicating an advanced phasing if the alcohol content has increased; or
  generating modified cam and crank position signals indicating a retarded phasing if the gasoline content has increased;

step (d) further comprises providing the modified cam and crank position signals to the engine control unit in place of the measured cam and crank position signals; and step (e) further comprises the engine control unit generating an engine control signal that controls cam timing actuators, a fuel injector, and an ignition control in the vehicle to advance or retard cam timing, fuel injection timing, and ignition timing depending on whether the phasing indicated by the modified cam and crank position signals generated in step (c) indicates advanced or retarded phasing compared to that indicated by the measured cam and crank position signals, thereby optimizing the performance of the engine for the increased alcohol or gasoline content in the alcohol/gasoline fuel blend.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
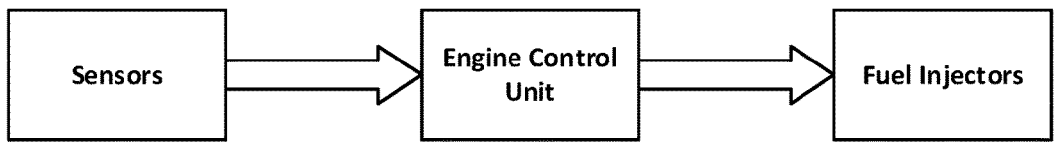
FIG. 1 depicts a conventional configuration of vehicle sensors, engine control unit, and fuel injectors.
Figure 2:
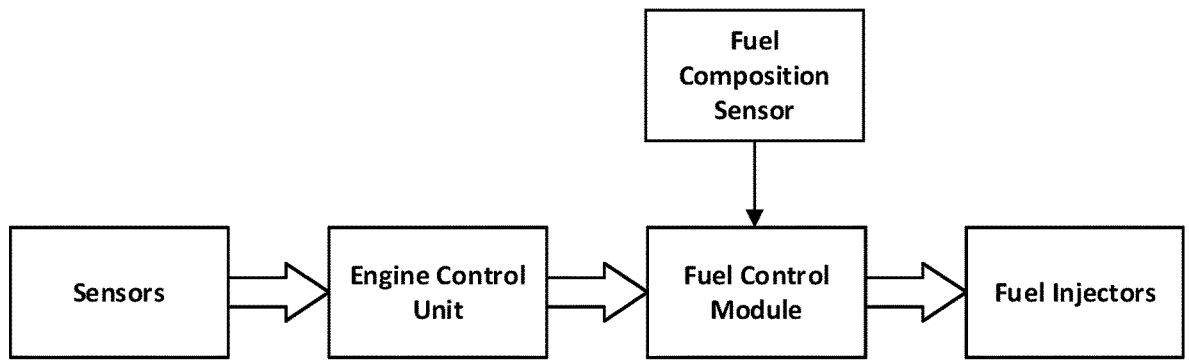
FIG. 2 depicts vehicle sensors, engine control unit, and fuel injectors, with a fuel control module inserted between the engine control unit and the fuel injectors according to a prior art configuration.
Figure 3:
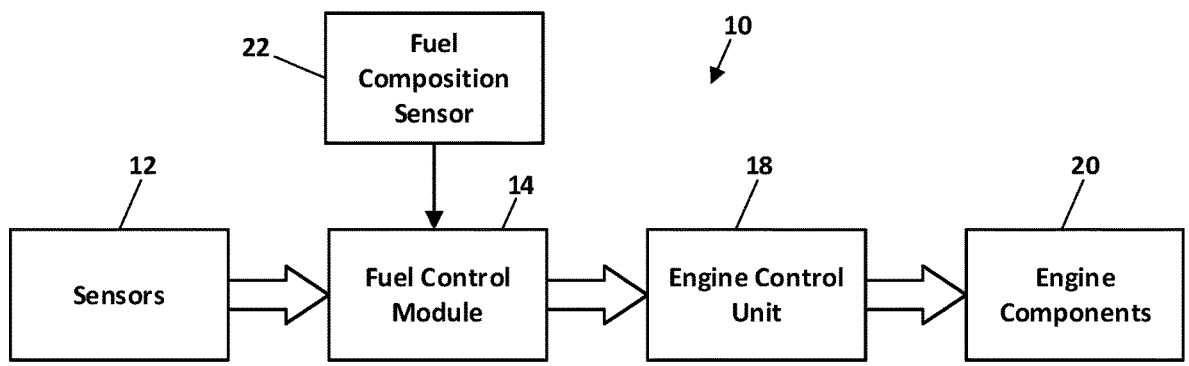
FIGS. 3 and 4 depict vehicle sensors, engine control unit, and engine control components, with a fuel control module inserted between the sensors and the engine control unit according to a preferred embodiment.
Figure 4:
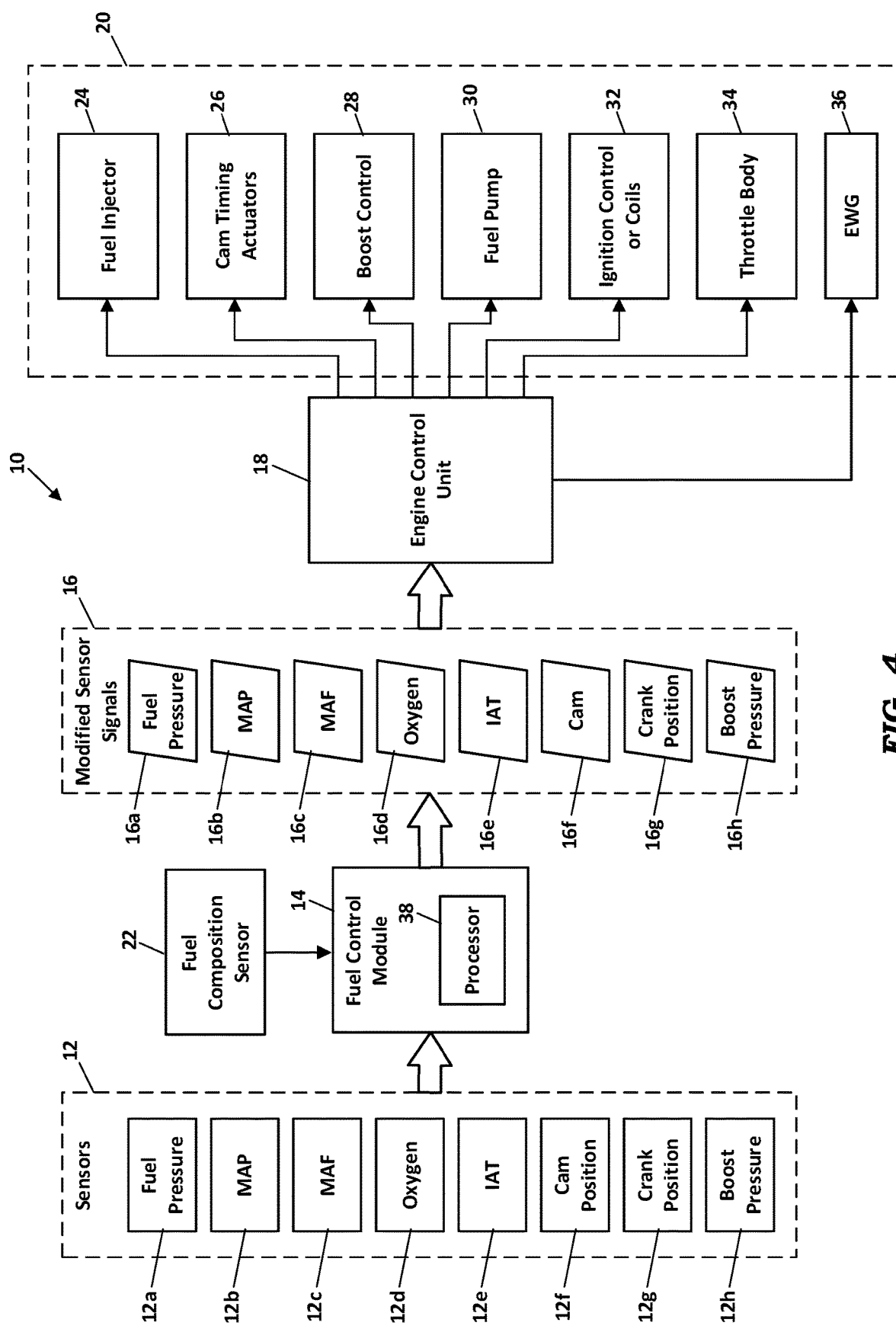

An embodiment of an adaptive fuel control system 10 is shown in FIGS. 3 and 4. The system 10 includes multiple vehicle sensors 12, an adaptive fuel control module 14, an engine control unit (ECU) 18, and various engine control components 20. The fuel control module 14 receives a fuel composition signal from a fuel composition sensor 22. The sensors 12 preferably include but are not limited to a fuel pressure sensor 12a, a manifold absolute pressure (MAP) sensor 12b, a mass air flow (MAF) sensor 12c, an oxygen sensor 12d, an intake air temperature (IAT) sensor 12e, a camshaft sensor 12f, a crank position sensor 12g, and a boost pressure sensor 12h. The engine control components 20 include but are not limited to a fuel injector 24, cam timing actuators 26, boost control 28, a fuel pump 30, ignition controls or coils 32, a throttle body 34, and an electronic waste gate (EWG) 36.

In one preferred embodiment, the fuel control module 14 and the fuel composition sensor 22 are aftermarket components that are installed in the vehicle after the vehicle leaves the factory. The fuel composition sensor 22 may be a standard component, such as a model number 13577394, 13577429, or 13577329 sensor manufactured by GM or others. In the preferred embodiment, the signal lines from the factory-installed sensors 12a-12h are disconnected from their inputs on the factory-installed ECU 18 and are connected to corresponding inputs on the fuel control module 14. The fuel control module 14 includes a processor 38 that is programmed to generate modified sensor signals 16a-16h. The programming of the processor 38 is described in more detail hereinafter. The fuel control module 14 provides outputs for the modified sensor signals 16a-16h on signal lines that connect to the corresponding inputs on the ECU 18. The modified sensor signals 16a-16h have voltage levels in standard ranges that the ECU 18 expects to receive, although the signals 16a-16h have been modified by the fuel control module 14 according to the content of the fuel in the vehicle's fuel tank as determined by the fuel composition sensor 22. The manner in which the sensor signals are modified are described in detail hereinafter.

Fuel Pressure Signal

Fuel pressure is a variable much like air flow. The engine control components 20 that are responsible for delivering the fuel to the engine, such as the fuel injector 24, provide a fixed rate at which fuel can flow at any given pressure. In most engines, the ECU 18 calculates the engine's fuel needs based on how much air is entering the engine, and the ECU 18 determines the amount of fuel to deliver based on air-to-fuel ratio calculations. Also, the ECU 18 uses the data from the pressure sensor 12a to determine how much fuel is being delivered to the engine. The ECU 18 is typically programmed to provide fuel flow at a rate that results in a particular air-to-fuel ratio for one type of gasoline fuel. However, alcohol fuels and alcohol/gasoline blends require different air-to-fuel ratios to burn properly.

In a preferred embodiment, the FCM 14 receives data from the fuel composition sensor 22 and data from the fuel pressure sensor 12a. Based on the fuel blend sensed by the fuel content composition sensor 22, the FCM 14 either adds to or subtracts from the pressure value indicated by the fuel pressure data to correctly offset the pressure data so that the ECU 18 will cause the optimum amount of blended fuel to be provided to the engine. The FMU's modification of the pressure signal 16a provided to the ECU 18 ensures that the engine will run properly on blended fuels, and also prevents the ECU from generating an error code due to incorrect fuel mixture.

Figure 5:
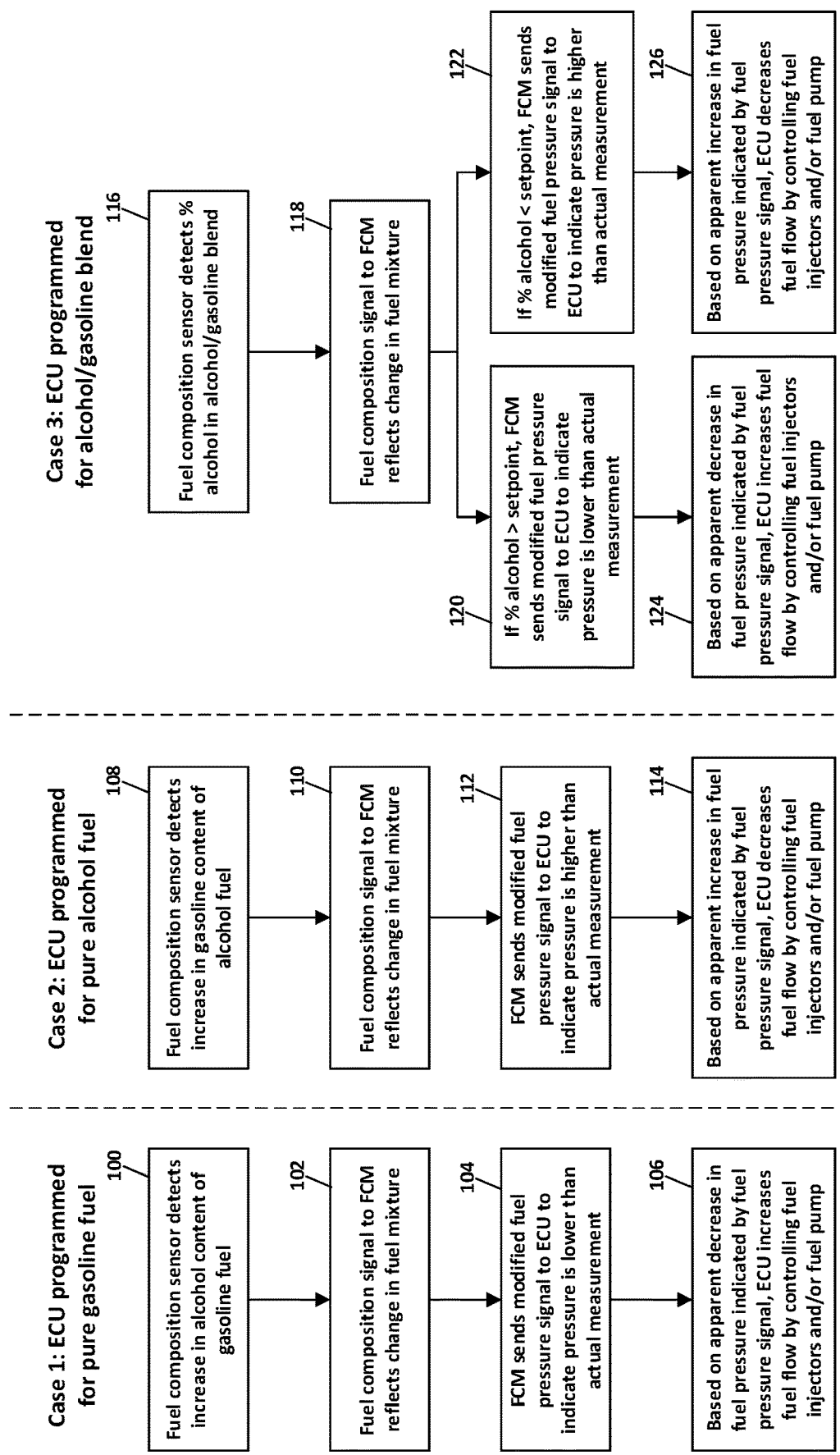
FIG. 5 depicts a method for modifying a fuel pressure signal provided to the engine control unit according to a preferred embodiment.

Thus, as shown in the flowchart of FIG. 5, three scenarios illustrate how the pressure signal 16a may be modified based on the type of fuel used and the ECU's initial programming. In a first scenario (Case 1) the ECU is programmed assuming that the engine will run on pure gasoline, in a second scenario (Case 2) the ECU is programmed assuming that the engine will run on pure alcohol, and in a third scenario (Case 3) the ECU is programmed assuming that the engine will run on a certain specific blend of gasoline and alcohol.

In Case 1, the fuel composition sensor 22 senses that alcohol has been introduced to the gasoline in the vehicle's fuel tank (step 100), and the sensor 22 generates a fuel composition signal that reflects an increase in alcohol content (step 102). Based on the fuel composition signal, the FCM 14 modifies the fuel pressure signal 16a to indicate that the fuel pressure is lower than the actual pressure indicated by the fuel pressure sensor 12a (step 104). Based on the apparent decrease in fuel pressure indicated by the modified fuel pressure signal, the ECU 18 causes the fuel injector 24 or fuel pump 30 to increase the fuel flow (step 106).

In Case 2, the fuel composition sensor 22 senses that gasoline has been introduced to the alcohol in the vehicle's fuel tank (step 108), and the sensor 22 generates a fuel composition signal that reflects an increase in gasoline content (step 110). Based on the fuel composition signal, the FCM 14 modifies the fuel pressure signal 16a to indicate that the fuel pressure is higher than the actual pressure indicated by the fuel pressure sensor 12a (step 112). Based on the apparent increase in fuel pressure indicated by the modified fuel pressure signal, the ECU 18 causes the fuel injector 24 or fuel pump 30 to decrease the fuel flow (step 114).

In Case 3, the fuel composition sensor 22 senses whether the percent alcohol in the gasoline/alcohol blend in the vehicle's fuel tank is greater or less than a percentage setpoint programmed into the ECU 18 (step 116), and the sensor 22 generates a fuel composition signal that reflects the change in alcohol content (step 118). If the fuel composition signal indicates that the percent alcohol is greater than the setpoint, the FCM 14 modifies the fuel pressure signal 16a to indicate that the fuel pressure is lower than the actual pressure indicated by the fuel pressure sensor 12a (step 120). If the fuel composition signal indicates that the percent alcohol is less than the setpoint, the FCM 14 modifies the fuel pressure signal 16a to indicate that the fuel pressure is higher than the actual pressure indicated by the fuel pressure sensor 12a (step 122). Based on the apparent decrease or increase in fuel pressure indicated by the modified fuel pressure signal, the ECU 18 causes the fuel injector 24 or fuel pump 30 to increase or decrease the fuel flow (steps 124 or 126).

Manifold Air Pressure (MAP)

The MAP sensor 12b is used for different things depending on the type of ECU 18 in use and the type of vehicle. In some systems, the ECU 18 determines the rate of air flow to the engine based on engine speed (RPM) and air pressure (MAP) to properly determine the fuel flow required for the engine to operate at a given time. In such systems, typically referred to as Speed Density systems, the FCM 14 modifies the MAP sensor signal 16b based on the signal from the fuel composition sensor 22 signal to cause the ECU 18 to adjust the fuel delivery accordingly. The FCM 14 adds to or subtracts from the MAP sensor value to compensate for the proper total fuel required based on the fuel blend. For example, a higher MAP value will cause the ECU 18 to call for a higher fuel flow rate, and a lower MAP value will cause the ECU 18 to call for a lower fuel flow rate. The FCM's modification of the MAP sensor signal 16b to the ECU 18 will maintain proper engine operation using blended fuels and prevent the ECU 18 from generating an error code due to an incorrect fuel mixture.

In some modern vehicle systems, the MAP sensor signal 16b is also used to control boost pressure. In such systems, the ECU 18 attempts to maintain a target boost pressure value based on the fuel blend it is programmed to use and based on vehicle operating conditions. The ECU 18 also uses the MAP sensor signal 16b to calculate torque. The boost pressure and torque variables are important because most modern ECU's have predetermined torque and/or boost limits programmed into them.

In preferred embodiments, the FCM 14 modifies the signal from the MAP sensor 12b based on the fuel information from the fuel composition sensor 22. Because alcohol fuels produce are more stable and produce more torque, engines burning such fuels can operate at higher boost pressures. Thus, the FCM 14 modifies the MAP sensor signal 16b to indicate a higher or lower MAP value depending on the fuel blend. This ensures that the MAP sensor signal 16b provided to the ECU 18 does not fall outside its programmed limits, thereby allowing more boost based on a higher blend of alcohol fuel without generating an ECU fault or causing a limp mode. If the ECU 18 is programmed to operate on pure alcohol fuel, but the user puts gasoline in the fuel tank, the FCM 14 modifies the MAP sensor signal 16b to indicate a higher MAP value, thereby causing the ECU 18 to pull the boost down to its target value. This keeps the engine within safe operating conditions for a blend of fuel that includes more gasoline than expected.

Figure 6:
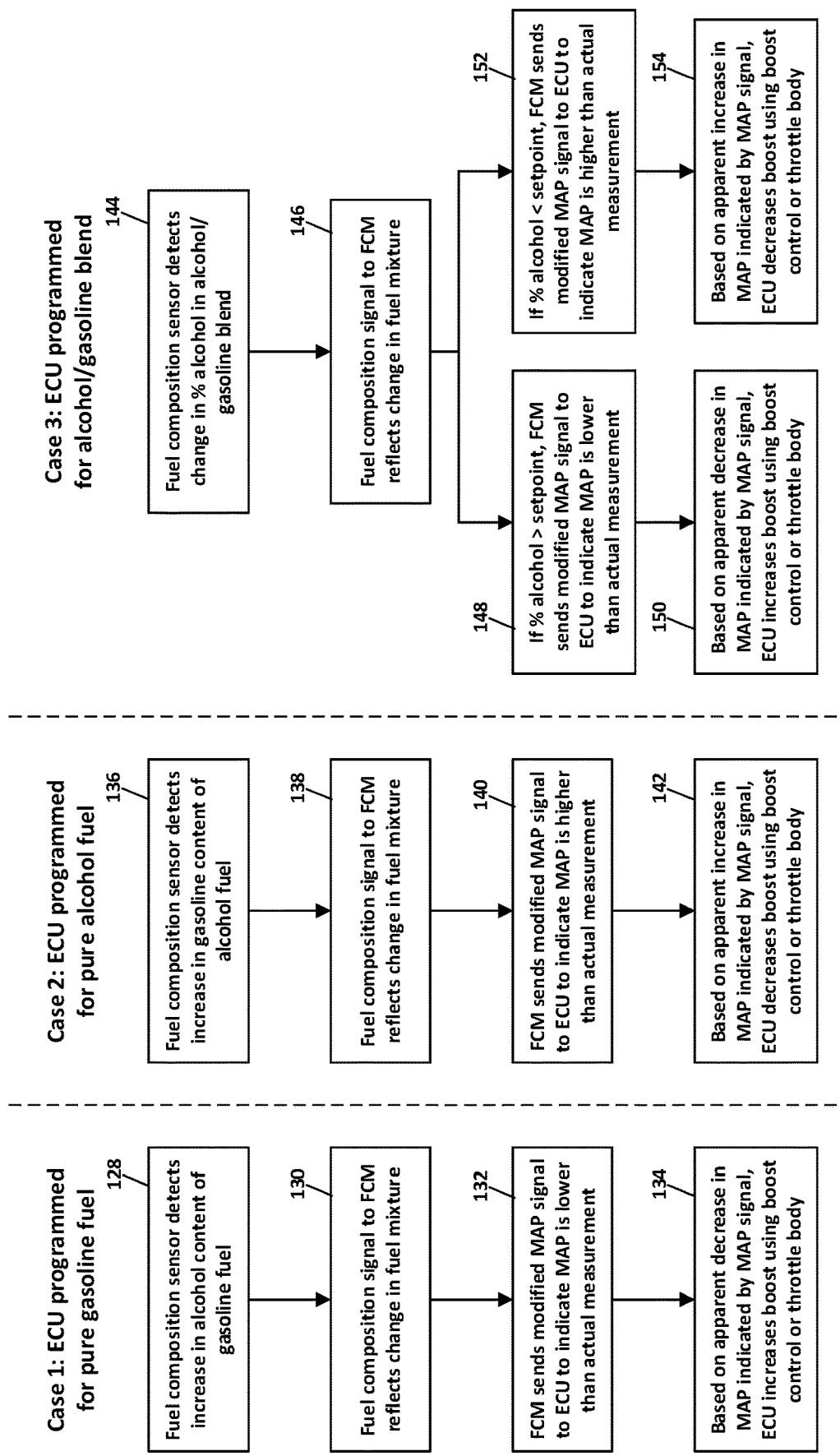
FIG. 6 depicts a first method for modifying a manifold air pressure signal provided to the engine control unit according to a preferred embodiment.

FIG. 6 depicts examples of three scenarios in which the MAP signal 16b is modified according to a first embodiment based on the type of fuel used and the ECU's initial programming. In a first scenario (Case 1) the ECU is programmed assuming that the engine will run on pure gasoline, in a second scenario (Case 2) the ECU is programmed assuming that the engine will run on pure alcohol, and in a third scenario (Case 3) the ECU is programmed assuming that the engine will run on a certain specific blend of gasoline and alcohol.

In Case 1 of FIG. 6, the fuel composition sensor 22 senses that alcohol has been introduced to the gasoline in the vehicle's fuel tank (step 128), and the sensor 22 generates a fuel composition signal that reflects an increase in alcohol content (step 130). Based on the fuel composition signal, the FCM 14 generates a modified MAP signal 16b that indicates the MAP is lower than the actual pressure indicated by the MAP sensor 12b (step 132). Based on the apparent decrease in MAP indicated by the modified MAP signal 16b, the ECU 18 causes an increase in the boost using the boost control or throttle body (step 134).

In Case 2 of FIG. 6, the fuel composition sensor 22 senses that gasoline has been introduced to the alcohol in the vehicle's fuel tank (step 136), and the sensor 22 generates a fuel composition signal that reflects an increase in gasoline content (step 138). Based on the fuel composition signal, the FCM 14 generates a modified MAP signal 16b that indicates the MAP is higher than the actual pressure indicated by the MAP sensor 12b (step 140). Based on the apparent increase in MAP indicated by the modified MAP signal 16b, the ECU 18 causes a decrease in the boost using the boost control or throttle body (step 134).

In Case 3 of FIG. 6, the fuel composition sensor 22 senses whether the percent alcohol in the gasoline/alcohol blend in the vehicle's fuel tank is greater or less than a percentage setpoint programmed into the ECU 18 (step 144), and the sensor 22 generates a fuel composition signal that reflects the change in alcohol content (step 146). If the fuel composition signal indicates that the percent alcohol is greater than the setpoint, the FCM 14 generates a modified MAP signal 16b that indicates the MAP is lower than the actual pressure indicated by the MAP sensor 12b (step 148). Based on the apparent decrease in MAP indicated by the modified MAP signal 16b, the ECU 18 causes an increase in the boost using the boost control or throttle body (step 150). If the fuel composition signal indicates that the percent alcohol is less than the setpoint, the FCM 14 generates a modified MAP signal 16b that indicates the MAP is higher than the actual pressure indicated by the MAP sensor 12b (step 152). Based on the apparent increase in MAP indicated by the modified MAP signal 16b, the ECU 18 causes a decrease in the boost using the boost control or throttle body (step 154).

Figure 7:
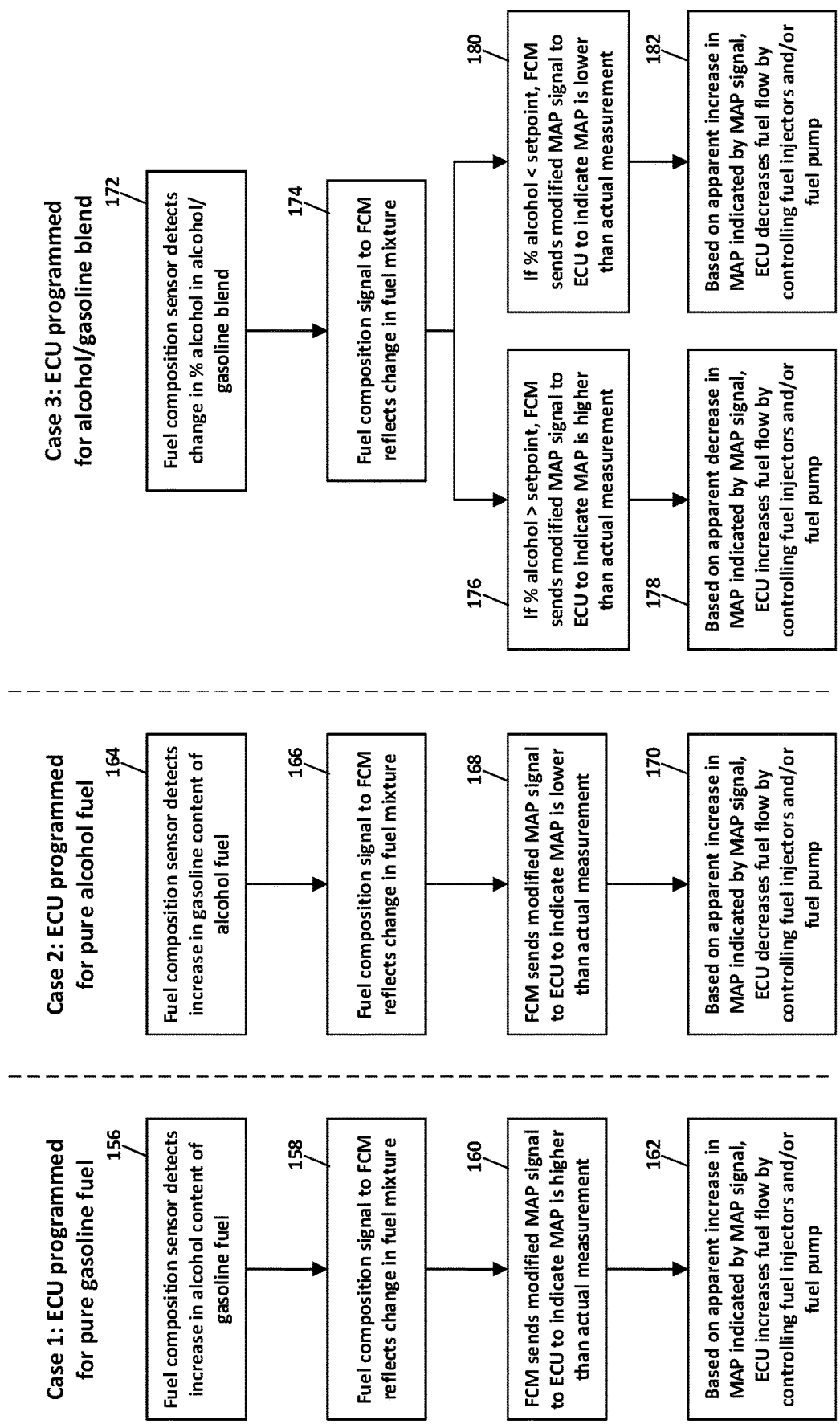
FIG. 7 depicts a second method for modifying a manifold air pressure signal provided to the engine control unit according to a preferred embodiment.

FIG. 7 depicts examples of three scenarios in which the MAP signal 16b is modified according to a second embodiment based on the type of fuel used and the ECU's initial programming. In a first scenario (Case 1) the ECU is programmed assuming that the engine will run on pure gasoline, in a second scenario (Case 2) the ECU is programmed assuming that the engine will run on pure alcohol, and in a third scenario (Case 3) the ECU is programmed assuming that the engine will run on a certain specific blend of gasoline and alcohol.

In Case 1 of FIG. 7, the fuel composition sensor 22 senses that alcohol has been introduced to the gasoline in the vehicle's fuel tank (step 156), and the sensor 22 generates a fuel composition signal that reflects an increase in alcohol content (step 158). Based on the fuel composition signal, the FCM 14 generates a modified MAP signal 16b that indicates the MAP is higher than the actual pressure indicated by the MAP sensor 12b (step 160). Based on the apparent increase in MAP indicated by the modified MAP signal 16b, the ECU 18 causes an increase in fuel flow rate by controlling the fuel injector 24 and/or the fuel pump 30 (step 162).

In Case 2 of FIG. 7, the fuel composition sensor 22 senses that gasoline has been introduced to the alcohol in the vehicle's fuel tank (step 164), and the sensor 22 generates a fuel composition signal that reflects an increase in gasoline content (step 166). Based on the fuel composition signal, the FCM 14 generates a modified MAP signal 16b that indicates the MAP is lower than the actual pressure indicated by the MAP sensor 12b (step 168). Based on the apparent decrease in MAP indicated by the modified MAP signal 16b, the ECU 18 causes a decrease in fuel flow rate by controlling the fuel injector 24 and/or the fuel pump 30 (step 162).

In Case 3 of FIG. 7, the fuel composition sensor 22 senses whether the percent alcohol in the gasoline/alcohol blend in the vehicle's fuel tank is greater or less than a percentage setpoint programmed into the ECU 18 (step 172), and the sensor 22 generates a fuel composition signal that reflects the change in alcohol content (step 174). If the fuel composition signal indicates that the percent alcohol is greater than the setpoint, the FCM 14 generates a modified MAP signal 16b that indicates the MAP is higher than the actual pressure indicated by the MAP sensor 12b (step 176). Based on the apparent increase in MAP indicated by the modified MAP signal 16b, the ECU 18 causes an increase in fuel flow rate by controlling the fuel injector 24 and/or the fuel pump 30 (step 178). If the fuel composition signal indicates that the percent alcohol is less than the setpoint, the FCM 14 generates a modified MAP signal 16b that indicates the MAP is lower than the actual pressure indicated by the MAP sensor 12b (step 180). Based on the apparent decrease in MAP indicated by the modified MAP signal 16b, the ECU 18 causes a decrease in fuel flow rate by controlling the fuel injector 24 and/or the fuel pump 30 (step 182).

Oxygen

The oxygen sensor 12d measures the burned combustion gases in the exhaust from the engine. The main purpose of the oxygen sensor 12d is to provide information to the ECU 18 regarding the gases coming out of the engine after combustion. The ECU 18 uses this information to determine whether its fuel delivery calculations have been correct. If those calculations result in ECU commands that lead to suboptimal combustion (as indicated by the oxygen sensor readings), the ECU 18 will start to compensate using a value referred to as TRIM. The TRIM value is determined after the fuel is burned. A high TRIM value generally indicates a high error rate. The TRIM value may be adjusted if the oxygen sensor indicates there is a significant difference between the amount of fuel that was actually delivered and burned versus what was expected. The TRIM value is usually set at the factory to a maximum that typically does not exceed 5%, although some systems will compensate for much higher errors.

In a preferred embodiment, the FCM 14 is programmed to minimize the TRIM value. The FMU 14 preferably compensates for differentiating fuel blends by modifying the fuel pressure signal 16a, the MAP signal 16b, the MAF signal 16c, and/or other sensor signals so that the engine can operate with as small a TRIM value as possible while running on any blend of fuel the user desires. Minimizing the TRIM value also prevents ECU errors and minimizes the functionality issues associated with using blended fuels.

The signal from the oxygen sensor 12d can also be modified to target a different air-to-fuel ratio if the user desires. For example, if the ECU 18 has been programmed to achieve an air-to-fuel ratio of 14.7, but the user desires a different mixture, the oxygen sensor signal can be modified by the FCM 14 to achieve this. In a preferred embodiment, because the ECU 18 will determine a proper TRIM value to make this happen, it should only be utilized for minor adjustments in the desired air-to-fuel ratio to provide better performance or better fuel mileage than can be achieved using the ECU's set desired air-to-fuel ratio when burning a blended fuel.

Figure 8:
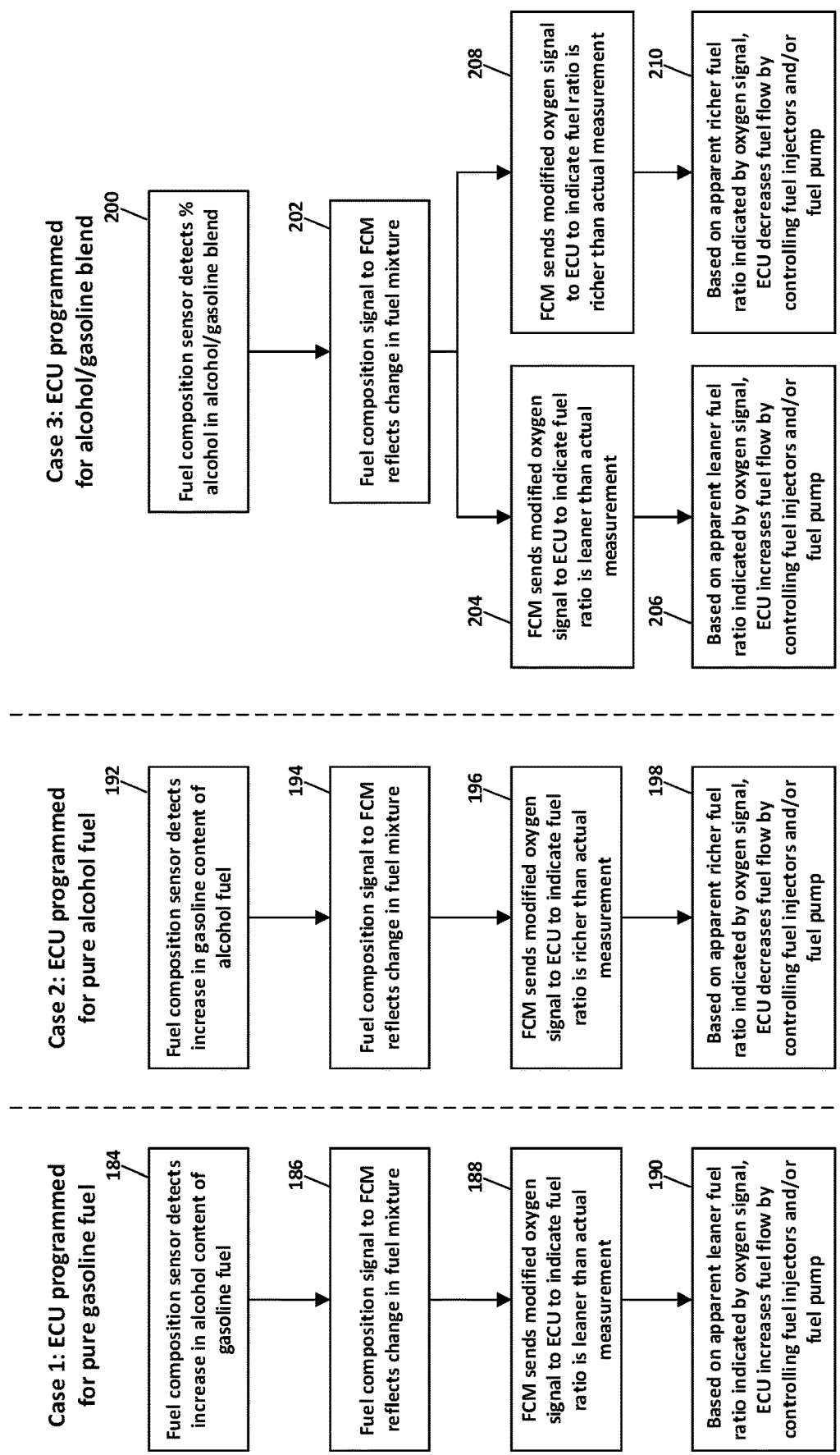
FIG. 8 depicts a method for modifying an oxygen signal provided to the engine control unit according to a preferred embodiment.

FIG. 8 depicts examples of three scenarios in which the oxygen signal 16d is modified according to a preferred embodiment based on the type of fuel used and the ECU's initial programming. In a first scenario (Case 1) the ECU is programmed assuming that the engine will run on pure gasoline, in a second scenario (Case 2) the ECU is programmed assuming that the engine will run on pure alcohol, and in a third scenario (Case 3) the ECU is programmed assuming that the engine will run on a certain specific blend of gasoline and alcohol.

In Case 1 of FIG. 8, the fuel composition sensor 22 senses that alcohol has been introduced to the gasoline in the vehicle's fuel tank (step 184), and the sensor 22 generates a fuel composition signal that reflects an increase in alcohol content (step 186). Based on the fuel composition signal, the FCM 14 generates a modified oxygen signal 16d that indicates the air-to-fuel ratio is higher (i.e., a leaner mix) than the actual oxygen level indicated by the oxygen sensor 12d (step 188). Based on the apparent change in the oxygen level as indicated by the modified oxygen signal 16d, the ECU 18 causes an increase in fuel flow rate by controlling the fuel injector 24 and/or the fuel pump 30 (step 190).

In Case 2 of FIG. 8, the fuel composition sensor 22 senses that gasoline has been introduced to the alcohol in the vehicle's fuel tank (step 192), and the sensor 22 generates a fuel composition signal that reflects an increase in gasoline content (step 194). Based on the fuel composition signal, the FCM 14 generates a modified oxygen signal 16d that indicates the air-to-fuel ratio is lower (i.e., a richer mix) than the actual oxygen level indicated by the oxygen sensor 12d (step 188). Based on the apparent change in the oxygen level as indicated by the modified oxygen signal 16d, the ECU 18 causes a decrease in fuel flow rate by controlling the fuel injector 24 and/or the fuel pump 30 (step 190).

In Case 3 of FIG. 8, the fuel composition sensor 22 senses whether the percent alcohol in the gasoline/alcohol blend in the vehicle's fuel tank is greater or less than a percentage setpoint programmed into the ECU 18 (step 200), and the sensor 22 generates a fuel composition signal that reflects the change in alcohol content (step 202). If the fuel composition signal indicates that the percent alcohol is greater than the setpoint, the FCM 14 generates a modified a modified oxygen signal 16d that indicates the air-to-fuel ratio is higher (i.e., a leaner mix) than the actual oxygen level indicated by the oxygen sensor 12d (step 204). Based on the apparent change in the oxygen level as indicated by the modified oxygen signal 16d, the ECU 18 causes an increase in fuel flow rate by controlling the fuel injector 24 and/or the fuel pump 30 (step 206). If the fuel composition signal indicates that the percent alcohol is less than the setpoint, the FCM 14 generates a modified a modified oxygen signal 16d that indicates the air-to-fuel ratio is lower (i.e., a richer mix) than the actual oxygen level indicated by the oxygen sensor 12d (step 208). Based on the apparent change in the oxygen level as indicated by the modified oxygen signal 16d, the ECU 18 causes a decrease in fuel flow rate by controlling the fuel injector 24 and/or the fuel pump 30 (step 210).

Mass Air Flow (MAF)

The mass air flow (MAF) sensor 12c directly measures the mass flow rate of air through various methods as the air enters the intake of the engine. Some MAF are combined with an intake air temperature (IAT) sensor. In most vehicles, the total fuel delivery to the engine is based heavily on the MAF value. In a preferred embodiment, based on fuel blend information from the fuel composition sensor 22 and data from the MAF sensor 12c, the FCM 14 and modifies the MAF signal 16c and sends the modified signal to the ECU 18. As described in more detail below, based on the modified MAF signal 16c, the ECU 18 controls the fuel injector 24 to deliver the optimum amount of fuel for operation with the given fuel blend. The FMU's modification of the MAF signal allows the ECU 18 to keep the engine running properly on blended fuels and prevents the ECU 18 from generating an error code due to an incorrect fuel mixture.

Figure 9:
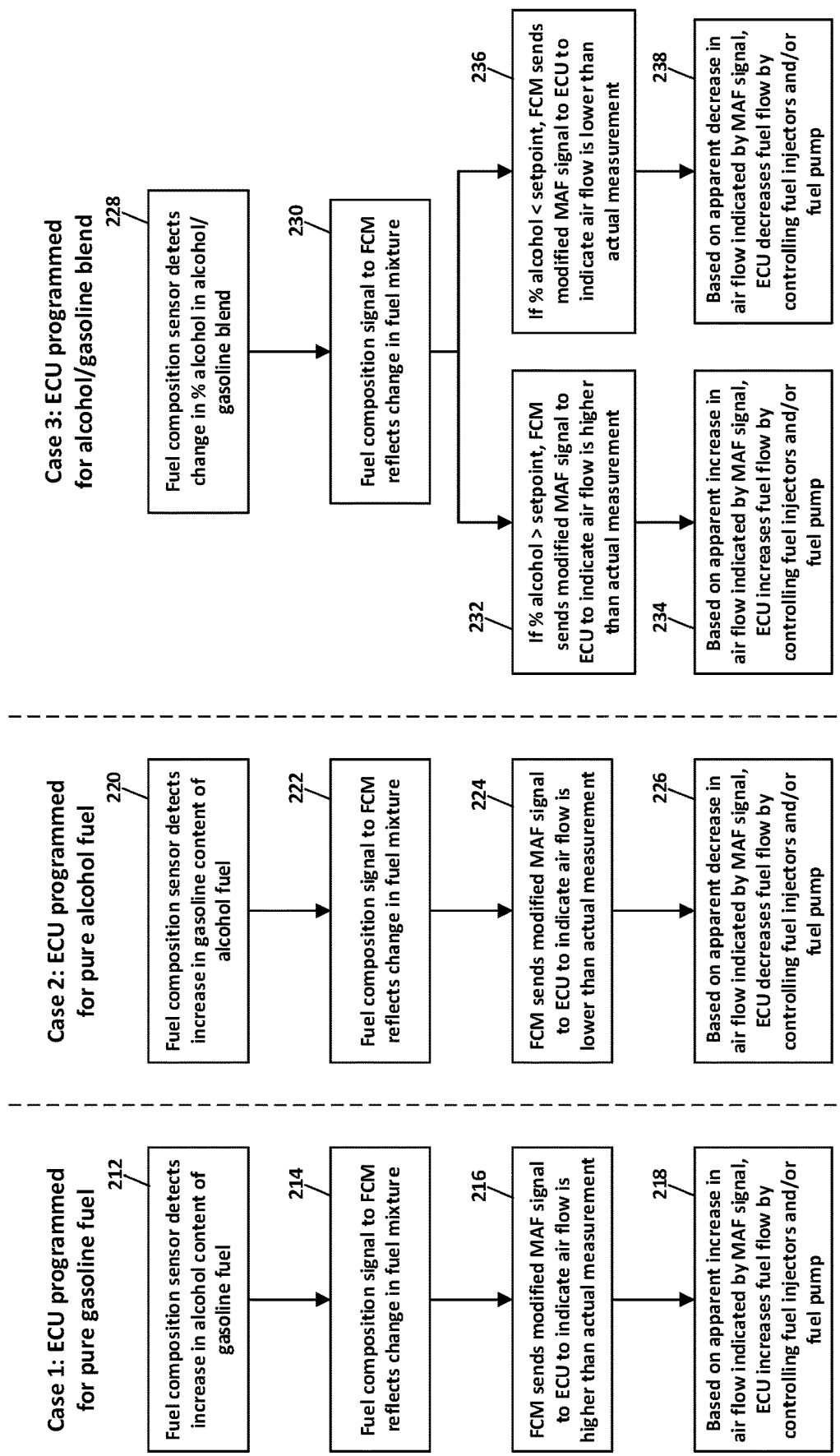
FIG. 9 depicts a method for modifying a mass air flow signal provided to the engine control unit according to a preferred embodiment.

FIG. 9 depicts examples of three scenarios in which the MAF signal 16c is modified according to a preferred embodiment based on the type of fuel used and the ECU's initial programming. In a first scenario (Case 1) the ECU is programmed assuming that the engine will run on pure gasoline, in a second scenario (Case 2) the ECU is programmed assuming that the engine will run on pure alcohol, and in a third scenario (Case 3) the ECU is programmed assuming that the engine will run on a certain specific blend of gasoline and alcohol.

In Case 1 of FIG. 9, the fuel composition sensor 22 senses that alcohol has been introduced to the gasoline in the vehicle's fuel tank (step 212), and the sensor 22 generates a fuel composition signal that reflects an increase in alcohol content (step 214). Based on the fuel composition signal, the FCM 14 generates a modified MAF signal 16c that indicates the air flow rate is higher than the actual air flow rate indicated by the MAF sensor 12c (step 216). Based on the apparent change in the air flow rate as indicated by the modified MAF signal 16c, the ECU 18 causes an increase in fuel flow rate by controlling the fuel injector 24 and/or the fuel pump 30 (step 218).

In Case 2 of FIG. 9, the fuel composition sensor 22 senses that gasoline has been introduced to the alcohol in the vehicle's fuel tank (step 220), and the sensor 22 generates a fuel composition signal that reflects an increase in gasoline content (step 222). Based on the fuel composition signal, the FCM 14 generates a modified MAF signal 16c that indicates the air flow rate is lower than the actual air flow rate indicated by the MAF sensor 12c (step 224). Based on the apparent change in the air flow rate as indicated by the modified MAF signal 16c, the ECU 18 causes a decrease in fuel flow rate by controlling the fuel injector 24 and/or the fuel pump 30 (step 226).

In Case 3 of FIG. 9, the fuel composition sensor 22 senses whether the percent alcohol in the gasoline/alcohol blend in the vehicle's fuel tank is greater or less than a percentage setpoint programmed into the ECU 18 (step 228), and the sensor 22 generates a fuel composition signal that reflects the change in alcohol content (step 230). If the fuel composition signal indicates that the percent alcohol is greater than the setpoint, the FCM 14 generates a modified MAF signal 16c that indicates the air flow rate is higher than the actual air flow rate indicated by the MAF sensor 12c (step 232). Based on the apparent change in the air flow rate as indicated by the modified MAF signal 16c, the ECU 18 causes an increase in fuel flow rate by controlling the fuel injector 24 and/or the fuel pump 30 (step 234). If the fuel composition signal indicates that the percent alcohol is less than the setpoint, the FCM 14 generates a modified MAF signal 16c that indicates the air flow rate is lower than the actual air flow rate indicated by the MAF sensor 12c (step 232). Based on the apparent change in the air flow rate as indicated by the modified MAF signal 16c, the ECU 18 causes a decrease in fuel flow rate by controlling the fuel injector 24 and/or the fuel pump 30 (step 234).

Intake Air Temperature (IAT)

The ECU 18 typically uses the intake air temperature (IAT) signal from the IAT sensor 12e to determine the density of the air and fuel entering the engine based on the temperature. The IAT signal can also be used to determine the stability of the air/fuel mixture. Using the air temperature data from the IAT signal allows the ECU to modify the base programmed ignition timing, because ignition timing can be more advanced when the air is cool than when it is hot.

In a preferred embodiment, the FCM 14 uses the fuel content information from the fuel composition sensor 22 and the temperature information from the IAT sensor 12e to generate a modified IAT signal 16e. Because alcohol fuels are far more stable than gasoline, using the modified IAT signal 16e, the ECU 18 can better optimize operation based on the fuel content through the FMU's logic interception.

Figure 10:
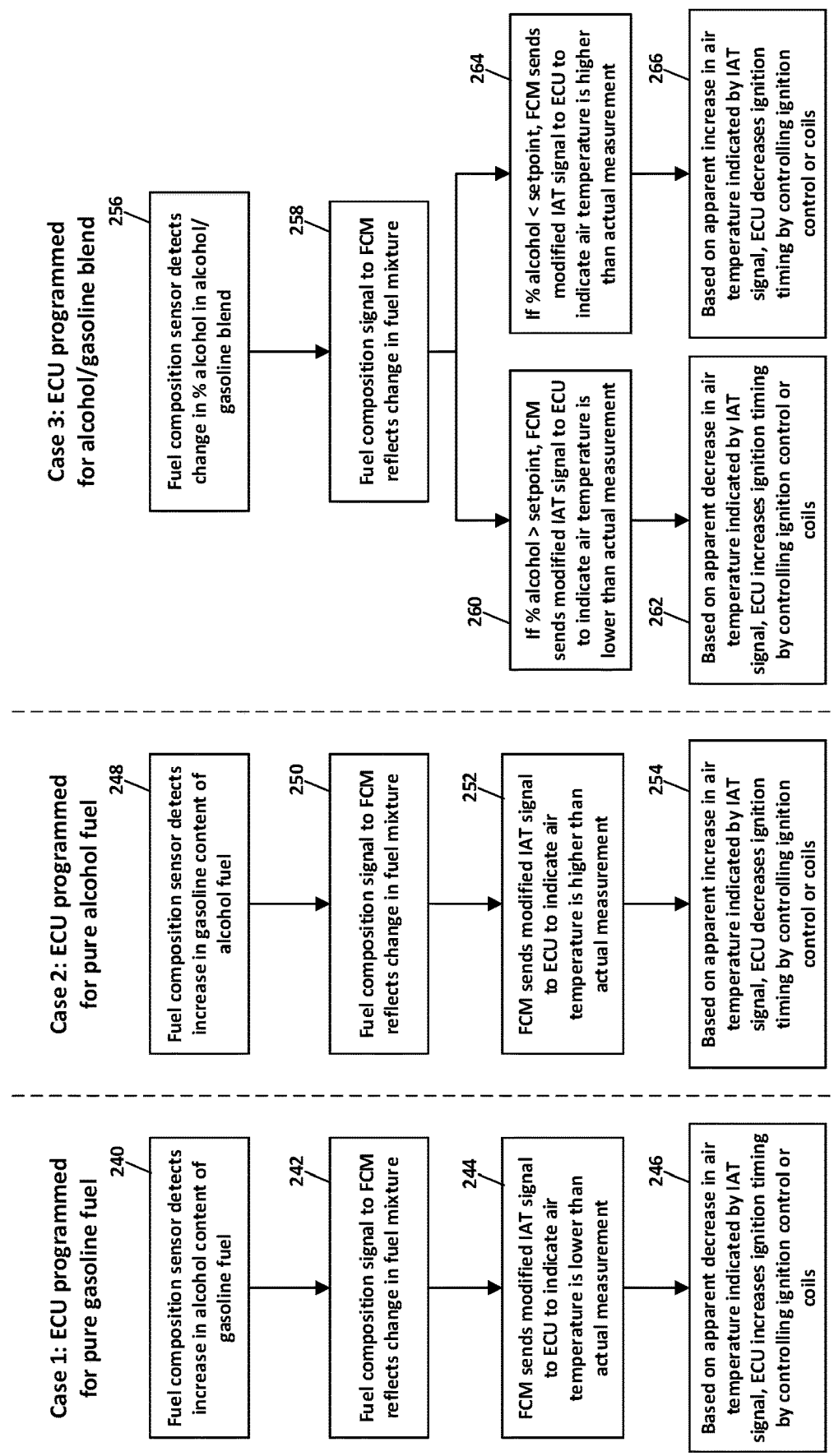
FIG. 10 depicts a method for modifying an intake air temperature signal provided to the engine control unit according to a preferred embodiment.

FIG. 10 depicts examples of three scenarios in which the IAT signal 16e is modified according to a preferred embodiment based on the type of fuel used and the ECU's initial programming. In a first scenario (Case 1) the ECU is programmed assuming that the engine will run on pure gasoline, in a second scenario (Case 2) the ECU is programmed assuming that the engine will run on pure alcohol, and in a third scenario (Case 3) the ECU is programmed assuming that the engine will run on a certain specific blend of gasoline and alcohol.

In Case 1 of FIG. 10, the fuel composition sensor 22 senses that alcohol has been introduced to the gasoline in the vehicle's fuel tank (step 240), and the sensor 22 generates a fuel composition signal that reflects an increase in alcohol content (step 242). Based on the fuel composition signal, the FCM 14 generates a modified IAT signal 16e that indicates the air temperature is lower than the actual air temperature indicated by the IAT sensor 12e (step 244). Based on the apparent change in the air temperature as indicated by the modified IAT signal 16e, the ECU 18 causes an increase in ignition timing by controlling the ignition control or coils (step 246).

In Case 2 of FIG. 10, the fuel composition sensor 22 senses that gasoline has been introduced to the alcohol in the vehicle's fuel tank (step 248), and the sensor 22 generates a fuel composition signal that reflects an increase in gasoline content (step 250). Based on the fuel composition signal, the FCM 14 generates a modified IAT signal 16e that indicates the air temperature is higher than the actual air temperature indicated by the IAT sensor 12e (step 252). Based on the apparent change in the air temperature as indicated by the modified IAT signal 16e, the ECU 18 causes a decrease in ignition timing by controlling the ignition control or coils (step 254).

In Case 3 of FIG. 10, the fuel composition sensor 22 senses whether the percent alcohol in the gasoline/alcohol blend in the vehicle's fuel tank is greater or less than a percentage setpoint programmed into the ECU 18 (step 256), and the sensor 22 generates a fuel composition signal that reflects the change in alcohol content (step 258). If the fuel composition signal indicates that the percent alcohol is greater than the setpoint, the FCM 14 generates a modified IAT signal 16e that indicates the air temperature is lower than the actual air temperature indicated by the IAT sensor 12e (step 260). Based on the apparent change in the air temperature as indicated by the modified IAT signal 16e, the ECU 18 causes an increase in ignition timing by controlling the ignition control or coils (step 262). If the fuel composition signal indicates that the percent alcohol is less than the setpoint, the FCM 14 generates a modified IAT signal 16e that indicates the air temperature is higher than the actual air temperature indicated by the IAT sensor 12e (step 264). Based on the apparent change in the air temperature as indicated by the modified IAT signal 16e, the ECU 18 causes a decrease in ignition timing by controlling the ignition control or coils (step 266).

CAM and Crank Positions

The CAM position sensor(s) 12f provide information to the ECU 18 regarding the general position of the engine in rotation, and the variable cam position in engines having variable cam timing. In engines that do not implement variable cam timing, the ECU 18 uses information regarding the position of the engine to determine when to fire the fuel injectors and spark plugs. For such engines, a preferred embodiment of the FCM 14 intercepts and modifies the signal(s) from the CAM position sensor(s) 12f to optimize the ignition timing based on the amount of alcohol in an alcohol/gasoline fuel blend. In engine systems that implement variable cam timing, the FCM 14 intercepts and modifies the signal(s) from the CAM position sensor(s) 12f based on the fuel content to optimize the cam timing in relation to the crank and ignition timing independently.

Similarly, the crank position sensor 12g provides further information to the ECU 18 regarding the position of the engine in rotation. The ECU 18 use this information to determine when to fire the fuel injectors and the spark plugs. A preferred embodiment of the FCM 14 intercepts and modifies the signal from the crank position sensor 12g to optimize the ignition timing based on the amount of alcohol in an alcohol/gasoline fuel blend.

Figure 11:
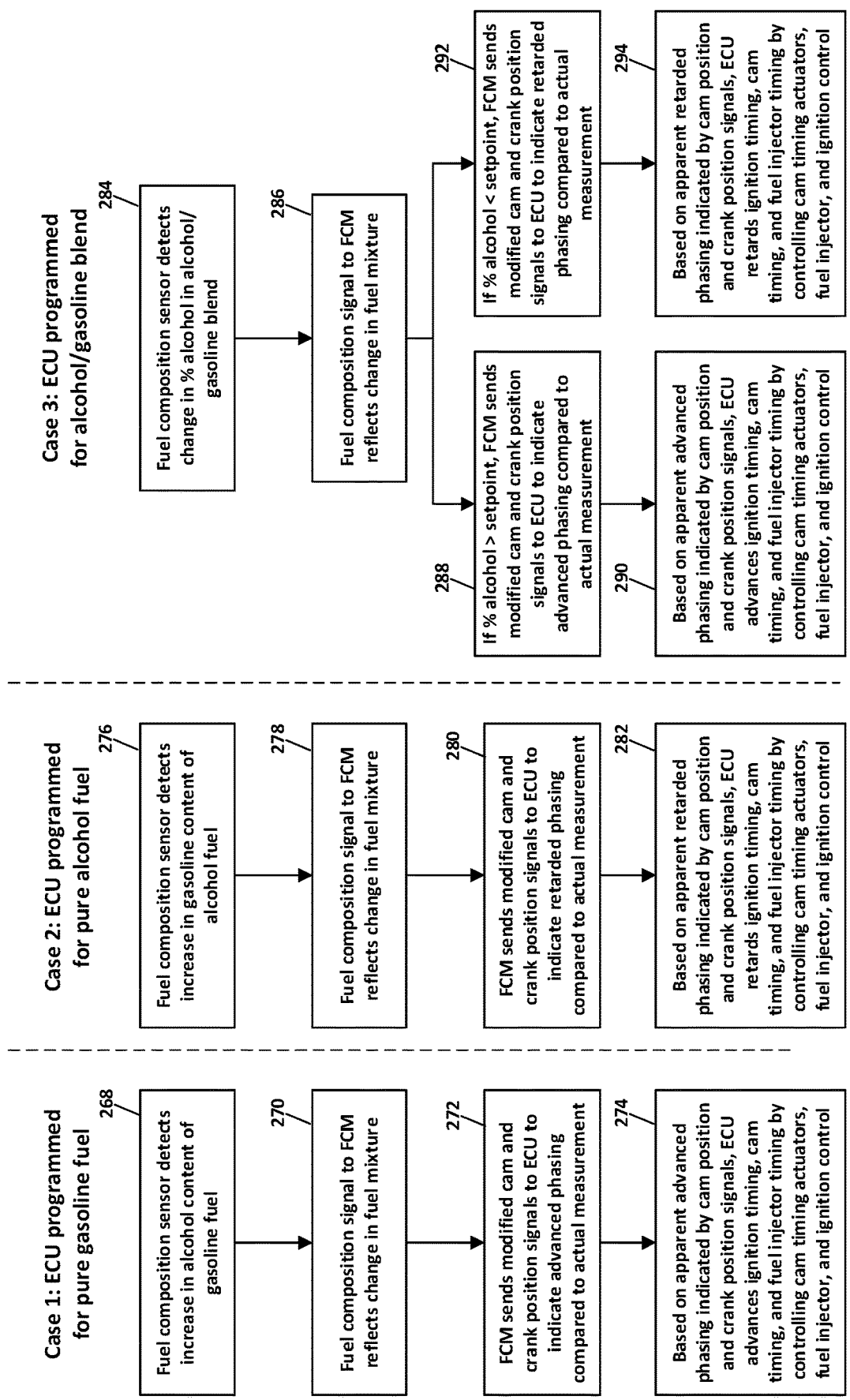
FIG. 11 depicts a method for modifying CAM and crank position signals provided to the engine control unit according to a preferred embodiment.

FIG. 11 depicts examples of three scenarios in which the CAM position signal(s) 16*f* and crank position signal 16*g* are modified according to a preferred embodiment based on the type of fuel used and the ECU's initial programming. In a first scenario (Case 1) the ECU is programmed assuming that the engine will run on pure gasoline, in a second scenario (Case 2) the ECU is programmed assuming that the engine will run on pure alcohol, and in a third scenario (Case 3) the ECU is programmed assuming that the engine will run on a certain specific blend of gasoline and alcohol.

In Case 1 of FIG. 11, the fuel composition sensor 22 senses that alcohol has been introduced to the gasoline in the vehicle's fuel tank (step 268), and the sensor 22 generates a fuel composition signal that reflects an increase in alcohol content (step 270). Based on the fuel composition signal, the FCM 14 generates modified CAM position signal(s) 16*f* and crank position signals 16*g* that indicate the phase of the ignition timing is advanced as compared to the actual phasing indicated by the CAM position sensor(s) 12*f* and the crank position sensor 12*g* (step 272). Based on the apparent change in ignition phasing as indicated by the modified CAM position and crank position signals 16*f*-16*g*, the ECU 18 causes an advance in the ignition timing, cam timing, and fuel injector timing by controlling the ignition control or coils 32, the cam timing actuators 26, and the fuel injector 24 (step 274).

Because the ECU is looking for a given crank or cam position to trigger all of its actions, advancing (or retarding) this triggering will advance (or retard) all of the ECU's processes at the same time. If the system has variable cam timing, then the ECU 18 will target a cam position. In that case, if an increase in cam timing is desired, the signal to the ECU 18 should indicate that the timing is more retarded, so that the ECU 18 will attempt to increase the timing to hit its target. This is done by comparing the timing of the cam position signal to the timing of the crank position signal to determine the needed phase of cam adjustment.

In Case 2 of FIG. 11, the fuel composition sensor 22 senses that gasoline has been introduced to the alcohol in the vehicle's fuel tank (step 276), and the sensor 22 generates a fuel composition signal that reflects an increase in gasoline content (step 278). Based on the fuel composition signal, the FCM 14 generates modified CAM position signal(s) 16*f* and crank position signals 16*g* that indicate the phase of the ignition timing is retarded as compared to the actual phasing indicated by the CAM position sensor(s) 12*f* and the crank position sensor 12*g* (step 280). Based on the apparent change in ignition phasing as indicated by the modified CAM position and crank position signals 16*f*-16*g*, the ECU 18 causes an the ignition timing, cam timing, and fuel injector timing to be retarded by controlling the ignition control or coils 32, the cam timing actuators 26, and the fuel injector 24 (step 282).

In Case 3 of FIG. 11, the fuel composition sensor 22 senses whether the percent alcohol in the gasoline/alcohol blend in the vehicle's fuel tank is greater or less than a percentage setpoint programmed into the ECU 18 (step 284), and the sensor 22 generates a fuel composition signal that reflects the change in alcohol content (step 286). If the fuel composition signal indicates that the percent alcohol is greater than the setpoint, the FCM 14 generates modified CAM position signal(s) 16*f* and crank position signals 16*g* that indicate the phase of the ignition timing is advanced as compared to the actual phasing indicated by the CAM position sensor(s) 12*f* and the crank position sensor 12*g* (step 288). Based on the apparent change in ignition phasing as indicated by the modified CAM position and crank position signals 16*f*-16*g*, the ECU 18 causes an advance in the ignition timing, cam timing, and fuel injector timing by controlling the ignition control or coils 32, the cam timing actuators 26, and the fuel injector 24 (step 290). If the fuel composition signal indicates that the percent alcohol is less than the setpoint, the FCM 14 generates modified CAM position signal(s) 16*f* and crank position signals 16*g* that indicate the phase of the ignition timing is retarded as compared to the actual phasing indicated by the CAM position sensor(s) 12*f* and the crank position sensor 12*g* (step 292). Based on the apparent change in ignition phasing as indicated by the modified CAM position and crank position signals 16*f*-16*g*, the ECU 18 causes an the ignition timing, cam timing, and fuel injector timing to be retarded by controlling the ignition control or coils 32, the cam timing actuators 26, and the fuel injector 24 (step 294).

Electronic Waste Gate (EWG)

Typically, wastegates are mechanically controlled by boost pressure. In such systems, the wastegate opens when the boost pressure exceeds the spring pressure in the diaphragm that holds the wastegate shut. In some systems, this is further controlled by allowing some of the boost pressure to be bleed off, thereby allowing for higher boost than the spring is mechanically set for. Aftermarket adjustments to such systems can be made manually.

In some vehicles, an electronic wastegate (EWG) 36 is controlled electronically by the ECU 18. In such systems, a preferred embodiment of the FMU 14 modifies the boost pressure signal 16*h* to optimize the boost pressure based on the fuel blend sensed by the fuel composition sensor 22, and the ECU 18 controls the EWG 36 based on the modified boost pressure signal 16*h*. In some embodiments, the control signal from the ECU 18 to the EWG 36 is intercepted and modified as needed to optimize the operation of the EWG 36 based on the measured boost pressure and the contents of the fuel blend.

As discussed above, the ECU 18 utilizes signals from multiple sensors to control the engine. Because the signals from various sensors are used in calculations made by the ECU 18, the FCM 14 intercepts the signals from the various sensors and modifies each sensor signal in conjunction with modifications to other sensor signals so as to not allow any single signal to fall outside of it expected operational limits. In this way, the ECU 18 works with the modified signals provided by the FMU 14 without generating faults. Thus, the FMU 14 can make adjustments to multiple sensor signals to cause the ECU's logic to operate in a manner that would not be possible through adjustments to just one sensor signal that are within that one sensor's expected operational limits. For example, if fuel delivery needs to be increased, this can be accomplished by modifying each of multiple sensor signals by a small amount instead of modifying one sensor signal by a large amount, which that may put the adjusted signal out of range and cause an ECU error.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An apparatus for modifying sensor signals provided to an engine control unit in a vehicle, wherein the sensor signals are generated by a plurality of vehicle sensors, and the engine control unit is configured to receive the sensor signals and generate engine control signals based at least in part on the sensor signals, the apparatus comprising:
    a fuel composition sensor that senses characteristics of fuel in the vehicle and generates a fuel composition signal based on the sensed characteristics; and
    a fuel control module that intercepts the sensor signals from the plurality of vehicle sensors, the fuel control module including a processor programmed to generate modified sensor signals based at least in part on the intercepted sensor signals and the fuel composition signal,
    wherein the modified sensor signals are provided to the engine control unit in place of the intercepted sensor signals from the plurality of vehicle sensors.

2. The apparatus of claim 1 wherein the fuel composition sensor generates the fuel composition signal that indicates a ratio of alcohol to gasoline in an alcohol/gasoline fuel blend.

3. The apparatus of claim 1 wherein the plurality of vehicle sensors include a fuel pressure sensor that generates a fuel pressure signal indicative of a measured fuel pressure measured by the fuel pressure sensor, and wherein:
    the fuel control module intercepts the fuel pressure signal; and
    the processor of the fuel control module is programmed to generate a modified fuel pressure signal indicating a fuel pressure value that is higher or lower than the measured fuel pressure.

4. The apparatus of claim 1 wherein the plurality of vehicle sensors include a manifold air pressure sensor that generates a manifold air pressure signal indicative of a measured manifold air pressure measured by the manifold air pressure sensor, and wherein:
    the fuel control module intercepts the manifold air pressure signal; and
    the processor of the fuel control module is programmed to generate a modified manifold air pressure signal indicating a manifold air pressure that is higher or lower than the measured manifold air pressure.

5. The apparatus of claim 1 wherein the plurality of vehicle sensors include a mass air flow sensor that generates a mass air flow signal indicative of a measured rate of mass air flow measured by the mass air flow sensor, and wherein:
    the fuel control module intercepts the mass air flow signal; and
    the processor of the fuel control module is programmed to generate a modified mass air flow signal indicating a rate of mass air flow that is higher or lower than the measured rate of mass air flow.

6. The apparatus of claim 1 wherein the plurality of vehicle sensors include an oxygen sensor that generates an oxygen signal indicative of a measured oxygen level measured by the oxygen sensor, and wherein:
    the fuel control module intercepts the oxygen signal; and
    the processor of the fuel control module is programmed to generate a modified oxygen signal indicating an oxygen level that is higher or lower than the measured oxygen level.

7. The apparatus of claim 1 wherein the plurality of vehicle sensors include an intake air temperature sensor that generates an intake air temperature signal indicative of a measured intake air temperature measured by the intake air temperature sensor, and wherein:
    the fuel control module intercepts the intake air temperature signal; and
    the processor of the fuel control module is programmed to generate a modified intake air temperature signal indicating an intake air temperature that is higher or lower than the measured intake air temperature.

8. The apparatus of claim 1 wherein the plurality of vehicle sensors include a cam position sensor that generates a cam position signal indicative of a measured cam position measured by the cam position sensor, and wherein:
    the fuel control module intercepts the cam position signal; and
    the processor of the fuel control module is programmed to generate a modified cam position signal indicating a cam position that is different from the measured cam position.

9. The apparatus of claim 1 wherein the plurality of vehicle sensors include a crank position sensor that generates a crank position signal indicative of a measured crank position measured by the crank position sensor, and wherein:
    the fuel control module intercepts the crank position signal; and
    the processor of the fuel control module is programmed to generate a modified crank position signal indicating a crank position that is different from the measured crank position.

10. The apparatus of claim 1 wherein the plurality of vehicle sensors include a boost pressure sensor that generates a boost pressure signal indicative of a measured boost pressure measured by the boost pressure sensor, and wherein:
    the fuel control module intercepts the boost pressure signal; and
    the processor of the fuel control module is programmed to generate a modified boost pressure signal indicating a boost pressure that is higher or lower than the measured boost pressure.

11. A method for optimizing the performance of a vehicle engine that is running on an alcohol/gasoline fuel blend, comprising:
    (a) generating one or more measured sensor signals, each indicative of an operational characteristic of the engine;
    (b) generating a fuel composition signal that is indicative of a ratio of alcohol to gasoline in the alcohol/gasoline fuel blend;
    (c) based at least in part on the fuel composition signal, generating one or more modified sensor signals corresponding to the one or more measured sensor signals;
    (d) providing the one or more modified sensor signals to an engine control unit in the vehicle in place of the one or more measured sensor signals;
    (e) the engine control unit generating engine control signals based at least in part on the one or more modified sensor signals, wherein the engine control signals optimize the performance of the engine for the ratio of alcohol to gasoline in the alcohol/gasoline fuel blend.

12. The method of claim 11 wherein:
    step (a) further comprises generating a measured fuel pressure signal indicative of a measured fuel pressure;
    step (b) further comprises generating the fuel composition signal indicating that the alcohol or gasoline content of the alcohol/gasoline fuel blend has changed;

step (c) further comprises:
  generating a modified fuel pressure signal indicating a fuel pressure that is lower than the measured fuel pressure if the alcohol content has increased; or
  generating a modified fuel pressure signal indicating a fuel pressure that is higher than the measured fuel pressure if the gasoline content has increased;
step (d) further comprises providing the modified fuel pressure signal to the engine control unit in place of the measured fuel pressure signal; and
step (e) further comprises the engine control unit generating an engine control signal that controls a fuel injector or fuel pump in the vehicle to increase or decrease the fuel flow rate depending on whether the fuel pressure indicated by the modified fuel pressure signal generated in step (c) is lower or higher than the measured fuel pressure, thereby optimizing the performance of the engine for the increased alcohol or gasoline content in the alcohol/gasoline fuel blend.

13. The method of claim 11 wherein:
step (a) further comprises generating a measured manifold air pressure signal indicative of a measured manifold air pressure;
step (b) further comprises generating the fuel composition signal indicating that the alcohol or gasoline content of the alcohol/gasoline fuel blend has changed;
step (c) further comprises:
  generating a modified manifold air pressure signal indicating a manifold air pressure that is lower than the measured manifold air pressure if the alcohol content has increased; or
  generating a modified manifold air pressure signal indicating a manifold air pressure that is higher than the measured manifold air pressure if the gasoline content has increased;
step (d) further comprises providing the modified manifold air pressure signal to the engine control unit in place of the measured manifold air pressure signal; and
step (e) further comprises the engine control unit generating an engine control signal that controls a boost control or throttle body in the vehicle to increase or decrease the boost depending on whether the manifold air pressure indicated by the modified manifold air pressure signal generated in step (c) is lower or higher than the measured manifold air pressure, thereby optimizing the performance of the engine for the increased alcohol or gasoline content in the alcohol/gasoline fuel blend.

14. The method of claim 11 wherein:
step (a) further comprises generating a measured manifold air pressure signal indicative of a measured manifold air pressure;
step (b) further comprises generating the fuel composition signal indicating that the alcohol or gasoline content of the alcohol/gasoline fuel blend has changed;
step (c) further comprises:
  generating a modified manifold air pressure signal indicating a manifold air pressure that is higher than the measured manifold air pressure if the alcohol content has increased; or
  generating a modified manifold air pressure signal indicating a manifold air pressure that is lower than the measured manifold air pressure if the gasoline content has increased;
step (d) further comprises providing the modified manifold air pressure signal to the engine control unit in place of the measured manifold air pressure signal; and
step (e) further comprises the engine control unit generating an engine control signal that controls a fuel injector or fuel pump in the vehicle to increase or decrease a fuel flow rate depending on whether the manifold air pressure indicated by the modified manifold air pressure signal generated in step (c) is higher or lower than the measured manifold air pressure, thereby optimizing the performance of the engine for the increased alcohol or gasoline content in the alcohol/gasoline fuel blend.

15. The method of claim 11 wherein:
step (a) further comprises generating a measured oxygen signal indicative of a measured oxygen content;
step (b) further comprises generating the fuel composition signal indicating that the alcohol or gasoline content of the alcohol/gasoline fuel blend has changed;
step (c) further comprises:
  generating a modified oxygen signal indicating a leaner fuel ratio if the alcohol content has increased; or
  generating a modified oxygen signal indicating a richer fuel ratio if the gasoline content has increased;
step (d) further comprises providing the modified oxygen signal to the engine control unit in place of the measured oxygen signal; and
step (e) further comprises the engine control unit generating an engine control signal that controls a fuel injector or fuel pump in the vehicle to increase or decrease a fuel flow rate depending on whether the oxygen content indicated by the modified oxygen signal generated in step (c) indicates a leaner or richer fuel ratio than indicated by the measured oxygen content signal, thereby optimizing the performance of the engine for the increased alcohol or gasoline content in the alcohol/gasoline fuel blend.

16. The method of claim 11 wherein:
step (a) further comprises generating a measured mass air flow signal indicative of a measured mass air flow rate;
step (b) further comprises generating the fuel composition signal indicating that the alcohol or gasoline content of the alcohol/gasoline fuel blend has changed;
step (c) further comprises:
  generating a modified mass air flow signal indicating a higher mass air flow rate if the alcohol content has increased; or
  generating a modified mass air flow signal indicating a lower mass air flow rate if the gasoline content has increased;
step (d) further comprises providing the modified mass air flow signal to the engine control unit in place of the measured mass air flow signal; and
step (e) further comprises the engine control unit generating an engine control signal that controls a fuel injector or fuel pump in the vehicle to increase or decrease a fuel flow rate depending on whether the mass air flow rate indicated by the modified mass air flow signal generated in step (c) indicates a higher or lower mass air flow rate than indicated by the measured mass air flow signal, thereby optimizing the performance of the engine for the increased alcohol or gasoline content in the alcohol/gasoline fuel blend.

17. The method of claim 11 wherein:
step (a) further comprises generating a measured intake air temperature signal indicative of a measured intake air temperature;
step (b) further comprises generating the fuel composition signal indicating that the alcohol or gasoline content of the alcohol/gasoline fuel blend has changed;

step (c) further comprises:
  generating a modified intake air temperature signal indicating a lower intake air temperature if the alcohol content has increased; or
  generating a modified intake air temperature signal indicating a higher intake air temperature if the gasoline content has increased;
step (d) further comprises providing the modified intake air temperature signal to the engine control unit in place of the measured intake air temperature signal; and
step (e) further comprises the engine control unit generating an engine control signal that controls an ignition control or coils in the vehicle to increase or decrease ignition timing depending on whether the intake air temperature indicated by the modified intake air temperature signal generated in step (c) indicates a lower or higher intake air temperature than indicated by the measured intake air temperature signal, thereby optimizing the performance of the engine for the increased alcohol or gasoline content in the alcohol/gasoline fuel blend.

18. The method of claim 11 wherein:
step (a) further comprises generating measured cam and crank position signals indicative of measured cam and crank positions;
step (b) further comprises generating the fuel composition signal indicating that the alcohol or gasoline content of the alcohol/gasoline fuel blend has changed;
step (c) further comprises:
  generating modified cam and crank position signals indicating an advanced phasing if the alcohol content has increased; or
  generating modified cam and crank position signals indicating a retarded phasing if the gasoline content has increased;
step (d) further comprises providing the modified cam and crank position signals to the engine control unit in place of the measured cam and crank position signals; and
step (e) further comprises the engine control unit generating an engine control signal that controls cam timing actuators, a fuel injector, and an ignition control in the vehicle to advance or retard cam timing, fuel injection timing, and ignition timing depending on whether the phasing indicated by the modified cam and crank position signals generated in step (c) indicates advanced or retarded phasing compared to that indicated by the measured cam and crank position signals, thereby optimizing the performance of the engine for the increased alcohol or gasoline content in the alcohol/gasoline fuel blend.

* * * * *